(12) United States Patent
Miyako et al.

(10) Patent No.: US 6,624,365 B2
(45) Date of Patent: Sep. 23, 2003

(54) STRUCTURE FOR MOUNTING SWITCH ON VEHICULAR STEERING WHEEL

(75) Inventors: Mamoru Miyako, Aichi (JP); Keisuke Imai, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 111 days.

(21) Appl. No.: 09/951,478

(22) Filed: Sep. 14, 2001

(65) Prior Publication Data

US 2002/0033321 A1 Mar. 21, 2002

(30) Foreign Application Priority Data

Sep. 18, 2000 (JP) .......................................... 2000-281889

(51) Int. Cl.[7] ................................................. H01H 9/00
(52) U.S. Cl. ................................ 200/61.54; 200/61.57; 280/728.2; 341/20
(58) Field of Search ..................... 200/61.54, 61.55, 200/61.57; 74/552, 484 R, 484 H; 280/728.2, 731; 340/425.5; 341/20, 22

(56) References Cited

U.S. PATENT DOCUMENTS

| | | | | |
|---|---|---|---|---|
| 4,590,340 A | * | 5/1986 | Koike et al. | 200/61.54 |
| 4,872,364 A | * | 10/1989 | Kaga et al. | 74/484 H |
| 5,350,190 A | | 9/1994 | Szigethy | 280/728 A |
| 5,403,981 A | * | 4/1995 | Chen et al. | 200/61.54 |
| 5,593,178 A | * | 1/1997 | Shiga et al. | 280/731 |
| 6,225,578 B1 | * | 5/2001 | Kobayashi et al. | 200/5 R |
| 6,250,665 B1 | * | 6/2001 | Sutherland et al. | 280/728.2 |

FOREIGN PATENT DOCUMENTS

| | | |
|---|---|---|
| DE | 41 40 275 A1 | 6/1992 |
| DE | 299 17 214 U1 | 3/2000 |
| EP | 0 635 388 A1 | 1/1995 |

* cited by examiner

Primary Examiner—Elvin Enad
Assistant Examiner—K. Lee
(74) Attorney, Agent, or Firm—Morgan, Lewis & Bockius LLP

(57) ABSTRACT

An outer casing (4) of a switch (3) is provided with mounting hooks (9), which are engaged with a core metal (11) of a steering wheel (1). A lower cover (12) of the steering wheel (1) is provided with retaining portions (13), which are made to abut against the mounting hooks (9) in such a way as to restrain the retaining portions (13) from moving in a direction in which the engagement between the core metal (11) and each of the retaining portions (13) is canceled. Consequently, the switch 3 (is) firmly mounted on the steering wheel (1). Thus, a stable mounting state of the switch (3) is obtained.

5 Claims, 4 Drawing Sheets

STRUCTURE FOR MOUNTING SWITCH ON VEHICULAR STEERING WHEEL

BACKGROUND OF THE INVENTION

The present invention relates to a steering wheel switch mounting structure for mounting a switch on a steering wheel of a vehicle.

In recent years, there has been provided a switch mounted on a steering wheel of a vehicle, for example, an automobile. The switch is used for operating, for instance, an audio player or an automatic transmission. The switch is generally mounted to the steering wheel so that a bracket on which the switch is mounted is screwed to the steering wheel, which is one type of the mounting structure. Further, there are another types of the mounting structure, that is, the switch is mounted so that the switch is directly screwed to the steering wheel, or the switch is directly pressed into a part made of a soft material of the steering wheel.

Among the aforementioned related structures, the mounting structure of the type screwing the bracket on which the switch is mounted to the steering wheel needs the bracket and the screw. Thus, the number of components of the structure of this type is large. Moreover, it takes time to screw the switch to the steering wheel. Consequently, the manufacturing cost thereof increases. Further, although the structure of the type screwing the switch directly to the steering wheel does not need a bracket, however, this structure still needs the screws. Therefore, the manufacturing cost of this structure is still high.

Furthermore, as compared with these conventional structures, the structure of the type pressing the switch into the part made of the soft material of the steering wheel needs neither the bracket nor the screw. However, since the part made of the soft material supports the mounted switch, this structure has a drawback in that the mounting state of the switch is unstable, namely, the mounted switch is unsteady.

SUMMARY OF THE INVENTION

The invention is accomplished in view of the aforementioned circumstances. Accordingly, an object of the invention is to provide a structure for mounting a switch on a vehicular steering wheel, which needs neither a bracket nor a screw and obtains a steady and stable mounting state of the switch.

To achieve the foregoing object, according to the invention, there is provided a structure (hereunder referred to a first structure) for mounting a switch on a vehicular steering wheel. The first structure comprises an outer casing accommodating a switch body of the switch;
- a mounting hook provided on the outer casing and engaged with the core metal;
- a lower cover covering a back of the steering wheel; and
- a retaining portion provided on the lower cover and being in contact with the mounting hook engaged with the core metal so as to restrain the mounting hook from moving in a direction in which engagement between the core metal and the mounting hook is canceled.

According to the first structure of the invention, the switch is mounted on the steering wheel without using a bracket and a screw. Moreover, the switch is mounted on a core metal of the steering wheel. Furthermore, the switch is more firmly mounted thereon by utilizing not only the engagement between the core metal and the mounting hook but also the retaining portion serving to restrain the hook portion from moving in a direction in which the engagement therebetween is canceled.

In this case, preferably, an embodiment (that is, a second structure) of the first structure of the invention is adapted so that the mounting hooks engage with the exterior of the core metal of the steering wheel, and that each of the retaining portions is in contact with the exterior of a corresponding one of the mounting hooks. Further, preferably, another embodiment (that is, a third structure) of the first structure of the invention is adapted so that each of the mounting hooks has a plurality of leg portions and engages with the core metal by being inserted into a hole portion of the core metal of the steering wheel, and that each of the retaining portions is inserted into a space provided among the leg portions of a corresponding one of the mounting hooks and in contact with the inner side surface of each of the leg portions thereof.

DETAILED DESCRIPTION OF PREFERRED EMBODIMENT

Figure 1:
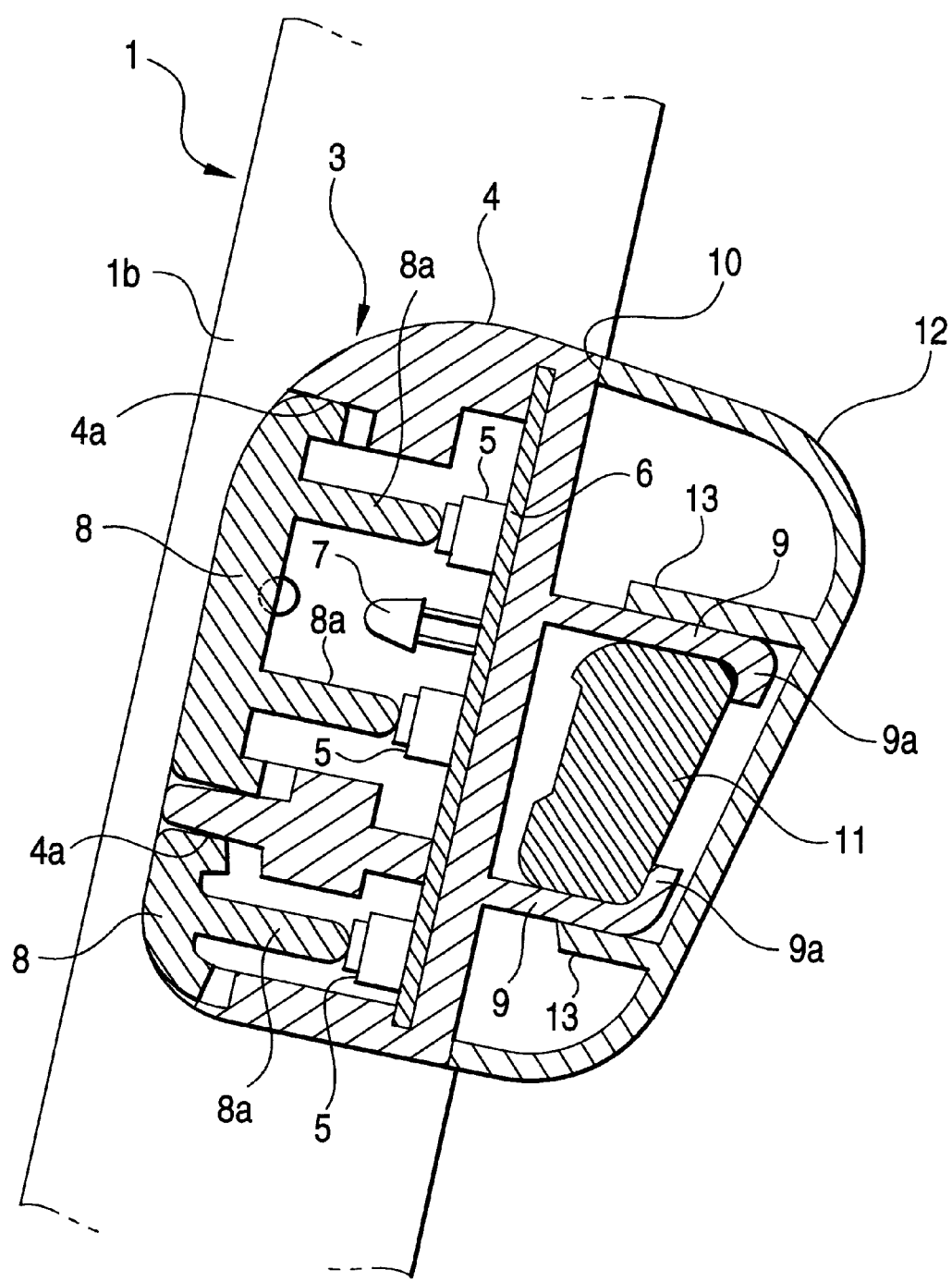
FIG. 1 is an enlarged longitudinally sectional side view illustrating a first embodiment of the invention, which is taken along line A—A of FIG. 2.

Hereinafter, a first embodiment of the invention is described with reference to FIGS. 1 and 2.

Figure 2:
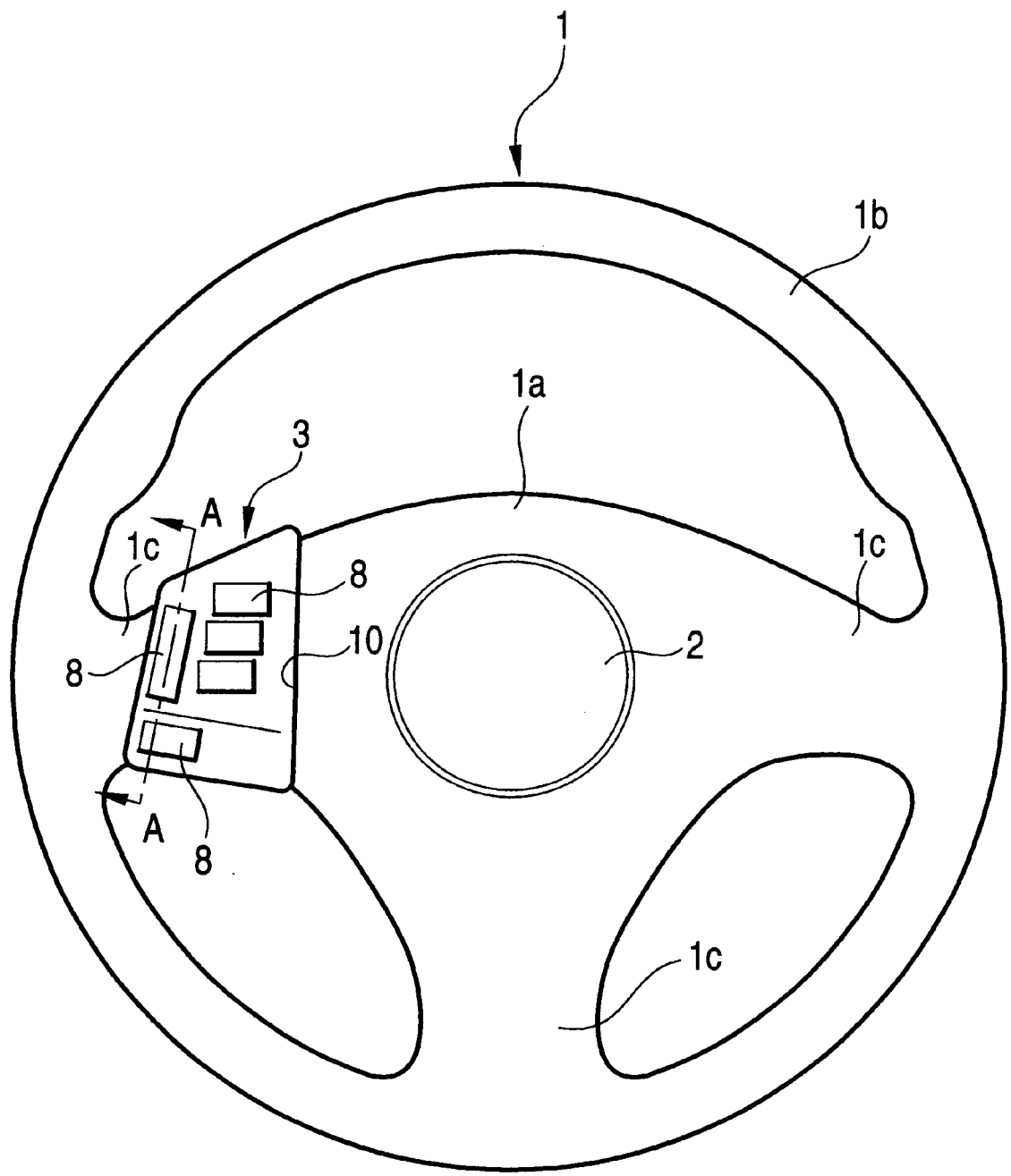
FIG. 2 is a plan view illustrating a steering wheel.

Referring first to FIG. 2, there is shown a steering wheel 1 of a vehicle, such as an automobile. This steering wheel 1 has a hub 1a provided at a central portion thereof, and a rim 1b provided in a peripheral portion thereof. Further, the hub 1a and the rim 1b are connected to each other through a plurality of spokes 1c.

The hub 1a of the steering wheel 1 is provided with a horn button 2. Further, a switch 3 is mounted in one of the spokes 1c (that is, the spoke shown in a left-side part of FIG. 2). FIG. 1 illustrates the configuration of the switch 3 and a structure for mounting this switch 3 on the steering wheel 1.

The switch 3 has an outer casing 4 in which switch bodies 5 are accommodated. The switch bodies 5 are, for instance, tact switches. A plurality of the switch bodies 5 are mounted on a wiring board 6. A plurality of light emitter for indicating operation, for example, light emitting diodes 7 are mounted on the wiring board 6 (incidentally, only one of such light emitter is shown in FIG. 1). These components are accommodated and fixed in the outer casing 4.

Further, the outer casing 4 has opening portions 4a formed in each of parts thereof, which respectively face the switch bodies 5 and the light emitting diodes 7. Operating buttons 8 serving as operating elements are fitted into the opening portions 4a, respectively. Each of the operating buttons 8 has one or more operating rods 8a provided on the back surface (that is, the right side surface, as viewed in FIG. 1) thereof corresponding to the switch bodies 5, respectively. In response to an operation of pushing the operating button 8, the one or more corresponding switch bodies 5 are pushed by the operating rods 8a corresponding to the switch bodies 5. Incidentally, in this case, the switch 3 is used for operating, for instance, an audio player or an automatic transmission. Various operations are performed on the switch 3 by pushing the operating buttons 8.

The outer casing 4 is made of, for example, plastic. The mounting hooks 9 are mounted in a back side portion, which is at the side opposite to the operating buttons 8, of the outer casing 4 in such a manner as to be integrally formed and project therefrom. Two of the mounting hooks 9 differing in, for instance, length from each other are placed in such a way as to face each other in an upward or downward direction, as viewed in FIG. 1. Each of the mounting hooks 9 has a hook projection 9a provided at the inward side of the tip end thereof.

On the other hand, a concave portion 10 is formed in the front side portion (that is, the left-side portion, as viewed in FIG. 1) of one of the spokes 1c of the steering wheel 1. The outer casing 4 of the switch 3 is fitted to the concave portion 10. In this fitting state, the mounting hooks 9 are engaged with a core metal 11 of the steering wheel 1 from the front side thereof. The core metal 11 is provided inside all of the hub 1a, the spoke 1c, and the rim 1b of the steering wheel 11, and is made of metal. The mounting hooks 9 are engaged with the exterior of a part of the core metal, which part lies in the spoke 1c and is the back side of the concave portion 10. Therefore, the core metal 11 is sandwiched between the two mounting hooks 9. The hook projections 9a are engaged with the upper and lower corner parts of a more rear portion of the core metal 11.

Furthermore, a lower cover 12 for covering the back side portion of the switch 3 and the core metal 11 is provided on the steering wheel 1. Further, retaining portions 13 are formed on the inner surface portion of this lower cover 12. The retaining portions 13 are established so that two of the retaining portions differing in, for instance, length from each other are provided in such a way as to face each other in an upward or downward direction, and that the distance between the two retaining portions facing each other is set in such a manner as to be nearly equal to the distance between the outer side surfaces of the two mounting hooks 9 facing each other. When the lower cover 12 is attached to the switch 3 after the mounting hooks 9 are engaged with the core metal 11, each of the retaining portions 13 is made to abut against a corresponding one of the mounting hooks 9, especially, against the outer side surface thereof.

Consequently, the mounting hooks 9 engaged with the core metal 11 are prevented by the retaining portions 13 from moving in a direction in which the engagement between the core metal 11 and each of the mounting hooks 9 is canceled. Thus, the switch 3 is mounted on the steering wheel 1. Incidentally, the surface portion of the switch 3 mounted thereon is almost flush with that of the steering wheel 1.

Thus, according to this embodiment, the switch 3 is mounted on the steering wheel 1 by utilizing the mounting hooks 9 provided in the outer casing 4 of the switch 3, and the retaining portions 13 provided on the lower cover 12 of the steering wheel 1. This embodiment does not need the bracket and the screw, which are needed in the related structure. Consequently, the manufacturing cost thereof is reduced.

Further, according to the first embodiment of this configuration, a component on which the switch 3 is mounted is the core metal 11 of the steering wheel 1. Thus, this embodiment does not cause the unsteadiness of the switch, which occurs owing to the softness of the soft material in the related structure adapted to press the switch into the soft material of the steering wheel. Moreover, in addition to engaging of the mounting hooks 9 with the core metal 11, the retaining portions 13 restrain the mounting hooks 9 from moving in the direction in which the engagement between the core metal 11 and each of the mounting hooks 9 is canceled. Consequently, the switch is more firmly mounted onto the steering wheel 1. Furthermore, a stable mounting state of the switch is obtained.

Figure 3:
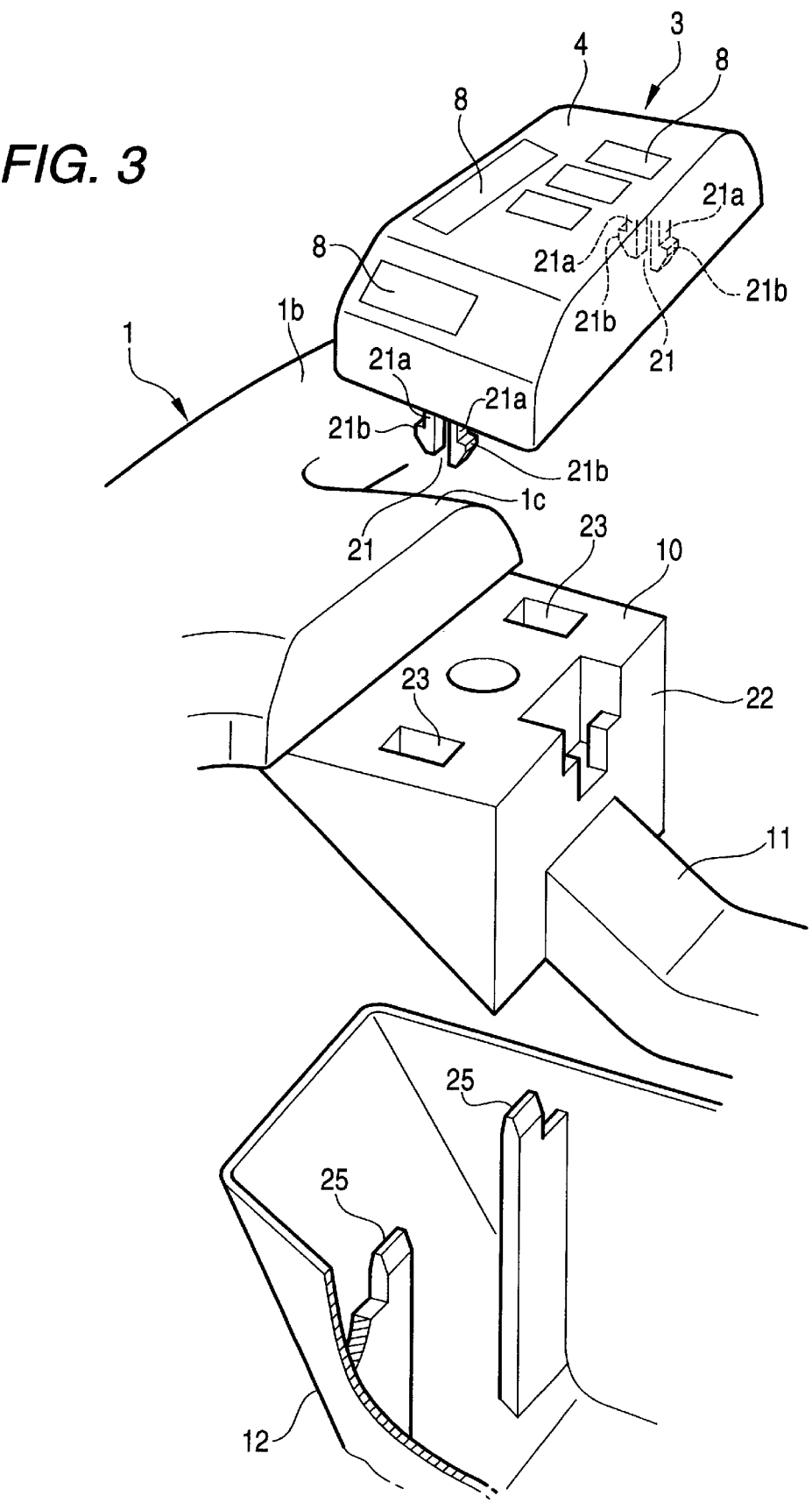
FIG. 3 is an exploded perspective view illustrating a primary part of a second embodiment of the invention.
Figure 4:
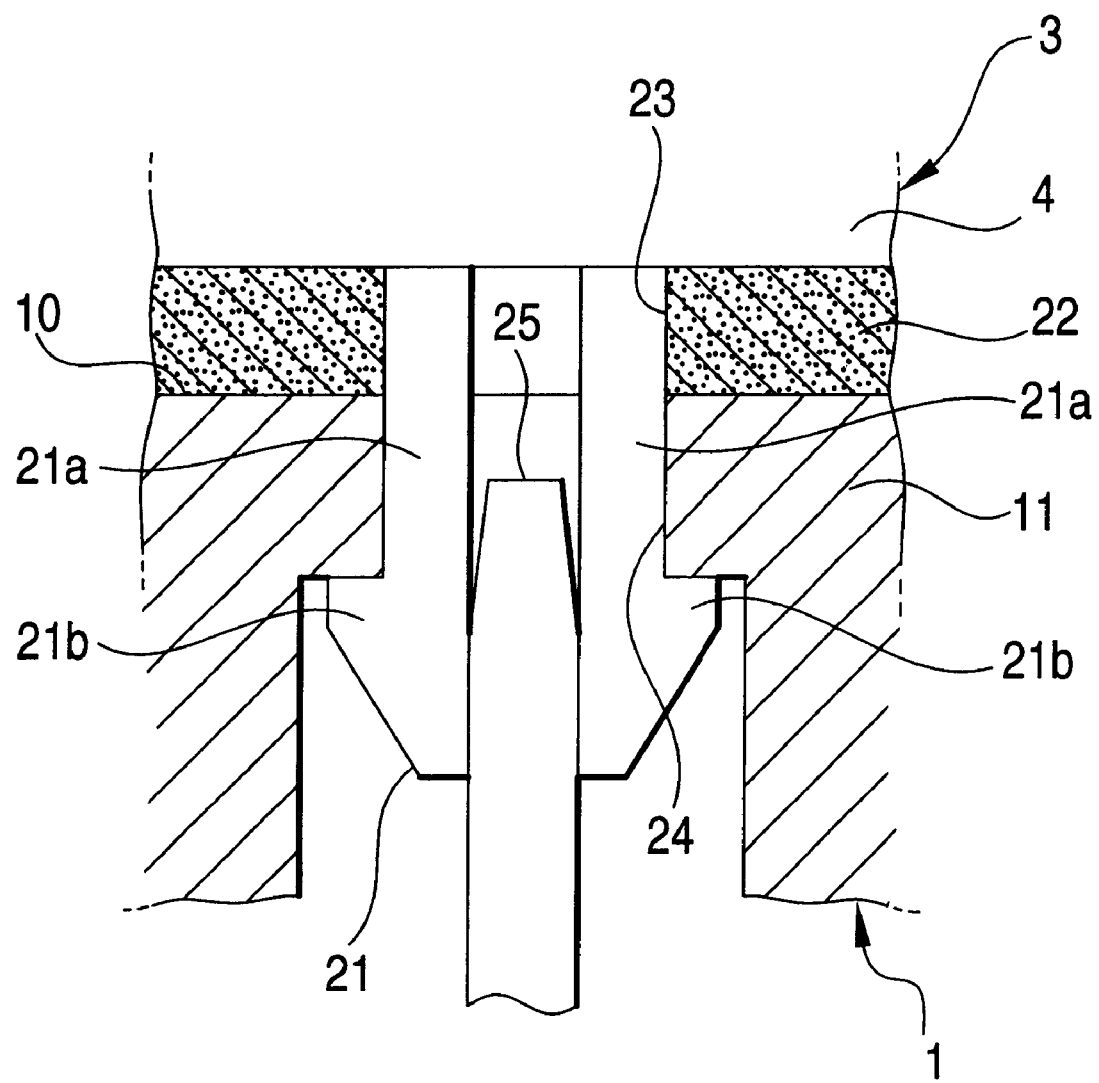
FIG. 4 is an enlarged sectional view illustrating a switch mounting portion.

FIGS. 3 and 4 illustrate a second embodiment of the invention for comparison with the first embodiment described hereinabove. In these figures, components of the second embodiment, which are the same as those of the first embodiment, are designated by the same reference character. Thus, the description of such components is omitted herein. Further, only the differences between the first and second embodiments are described hereinafter.

In the case of the second embodiment, two pairs, that is, upper and lower pairs of mounting hooks 21 are provided on the back side of an outer casing 4 of a switch 3 in such a way as to project therefrom. Each of these mounting hooks 21 has a plurality of leg portions 21a (incidentally, two leg portions 21a in this case). A hook projection 21b is provided on the outer side of the tip end part of each of the leg portions 21a. On the other hand, in a concave portion 10 form in one of spokes 1c of the steering wheel 1, a core metal 11 is exposed therefrom. As shown in FIG. 4, hole portions 23 and 24 are formed correspondingly to each of the mounting hooks 21 of the switch 3 in such a manner as to be aligned with each other and as to penetrate the soft material 22 and the core metal Furthermore, a retaining portion 25 is formed like a plate and is provided on the inner surface of the lower cover 12 correspondingly to each of the mounting hooks 21 of the switch 3 in such a way as to extend in a direction perpendicular to the corresponding mounting hook 21 and as to be tapered toward the tip end thereof.

Thus, in the case of the second embodiment, each of the mounting hooks 21 is inserted into the hole portions 23 and 24 from the front side of the switch 3 (that is, from above, as viewed in these figures), and then the hook projection 21b thereof is engaged with a back side peripheral part of the hole portion 24. Further, when the lower cover 12 is attached to the switch 3 in this state, each of the retaining portions 25 is inserted into a space provided between the leg portions 21a of a corresponding one of the mounting hooks 21 from the back side of the switch 3 (that is, from below in these figures). Thus, each of the retaining portions 25 comes in contact with the inner side surface of each of the leg portions 21a of the corresponding mounting hook 21 and restrains the corresponding mounting hook 21 engaged with the core metal 11 from moving in a direction in which the engagement between this mounting hook 21 and the core metal 11 is canceled. Consequently, this embodiment prevents the mounting hooks 21 from disengaging from the core metal 11, and serves to mount the switch 3 on the steering wheel 1.

According to the second embodiment, the switch 3 is mounted on the steering wheel 1 without using the bracket and the screw, which are needed in the related structure. Moreover, a component on which the switch 3 is mounted is the core metal 11 of the steering wheel 1. Moreover, in addition to engaging of the mounting hooks 21 with the core metal 11, the retaining portions 25 restrain the mounting hooks 21 from moving in the direction in which the engagement between the core metal 11 and each of the mounting hooks 21 is canceled. Consequently, the switch is more firmly mounted onto the steering wheel 1. Furthermore, a stable mounting state of the switch is obtained.

Incidentally, the first embodiment does not need to form holes in the core metal 11 of the steering wheel 1 as in the second embodiment. Therefore, the first embodiment has advantages over the second embodiment in maintaining the strength of the core metal 11, thus, the strength of the steering wheel 1 at a high level.

In the above description, the plurality of the mounting hooks is utilized for the engagement with the core metal. The present invention is not restricted thereto or thereby. For example, the single mounting hook may be utilized for the engagement with the core metal.

As is apparent from the foregoing description, the structure for mounting a switch on a vehicular steering wheel according to the invention has excellent advantageous effects in that neither a bracket nor a screw is needed for mounting the switch to the steering wheel, and that a steady and stable mounting state is obtained.

What is claimed is:

1. A structure for mounting a switch on a steering wheel including a core metal therein of a vehicle, the structure comprising:

an outer casing accommodating a switch body of the switch;

a mounting hook provided on the outer casing and engaged with the core metal;

a lower cover covering a back of the steering wheel; and a retaining portion provided on the lower cover and being in contact with the mounting hook engaged with the core metal so as to restrain the mounting hook from moving in a direction in which engagement between the core metal and the mounting hook is canceled.

2. The structure according to claim 1, wherein the mounting hook engages with an exterior of the core metal, and the retaining portion is in contact with an exterior of the mounting hook.

3. The structure according to claim 2, wherein a pair of the mounting hooks is provided on the outer casing, a pair of the retaining portions is provided on the lower covering, the core metal is sandwiched between the pair of the mounting hooks, and the pair of the retaining portions are in contact with exterior of the pair of the mounting hooks, respectively.

4. The structure according to claim 2, wherein a tip end of the mounting hook is provided with a hook projection extending so as to be engaged with a rear portion of the core metal.

5. The structure according to claim 1, wherein the mounting hook has a plurality of leg portions and is inserted into and engaged with a hole portion of the core metal, and the retaining portion is inserted into a space provided among the leg portions and in contact with an inner side surface of each of the leg portions.

* * * * *